United States Patent
Park et al.

(10) Patent No.: US 12,487,078 B2
(45) Date of Patent: Dec. 2, 2025

(54) APPARATUS FOR CONTINUOUSLY MEASURING THICKNESS OF THIN MATERIAL, METHOD FOR CONTINUOUSLY MEASURING THICKNESS OF THIN MATERIAL USING SAME, AND METHOD FOR MANUFACTURING HIGH-TEMPERATURE SUPERCONDUCTING WIRE USING SAME

(71) Applicant: KOREA ELECTROTECHNOLOGY RESEARCH INSTITUTE, Gyeongsangnam-do (KR)

(72) Inventors: In Sung Park, Gyeongsangnam-do (KR); Gwan Tae Kim, Gyeongsangnam-do (KR); Ho Sup Kim, Gyeongsangnam-do (KR); Hong Soo Ha, Gyeongsangnam-do (KR)

(73) Assignee: KOREAN ELECTROTECHNOLOGY RESEARCH INSTITUTE, Gyeongsangnam-do (KR)

( * ) Notice: Subject to any disclaimer, the term of this patent is extended or adjusted under 35 U.S.C. 154(b) by 0 days.

(21) Appl. No.: 18/280,273

(22) PCT Filed: Aug. 7, 2023

(86) PCT No.: PCT/KR2023/011569
§ 371 (c)(1),
(2) Date: Sep. 5, 2023

(87) PCT Pub. No.: WO2024/122793
PCT Pub. Date: Jun. 13, 2024

(65) Prior Publication Data
US 2025/0020451 A1    Jan. 16, 2025

(30) Foreign Application Priority Data

Dec. 5, 2022  (KR) .................. 10-2022-0167829

(51) Int. Cl.
*G01B 11/06*    (2006.01)
*H01B 12/02*    (2006.01)

(52) U.S. Cl.
CPC ...... *G01B 11/0691* (2013.01); *G01B 11/0608* (2013.01); *H01B 12/02* (2013.01)

(58) Field of Classification Search
CPC ........................ G01B 11/06; G01B 11/0608
(Continued)

(56) References Cited

U.S. PATENT DOCUMENTS

| | | | | |
|---|---|---|---|---|
| 5,773,714 A | * | 6/1998 | Shead | G01B 5/0014 702/170 |
| 2012/0111103 A1 | * | 5/2012 | Matsumoto | G01B 21/30 73/150 R |

FOREIGN PATENT DOCUMENTS

KR    10-2245087    4/2021

* cited by examiner

*Primary Examiner* — Thanh Luu
(74) *Attorney, Agent, or Firm* — JCIPRNET (57) ABSTRACT

An apparatus for continuously measuring the thickness of a thin material includes a main frame configured by upper and lower frames provided in a direction crossing with a movement direction of a thin material and a vertical frame which connects the upper and lower frames, upper and lower sliders moved by sliding along guide grooves formed in the upper and lower frames; an upper confocal sensor radiating light toward the thin material, and a lower confocal sensor radiating light toward the thin material, wherein the upper and lower confocal sensors are disposed on the same axis, and height measurement is performed by receiving light only at a moment when a focus coincides at a measurement position, and wherein the upper confocal sensor and the upper slider and the lower confocal sensor and the lower slider are synchronously controlled, and are controlled in conjunction with movement of the thin material.

2 Claims, 8 Drawing Sheets

(58) Field of Classification Search
USPC .............. 356/630; 250/559.06, 559.27
See application file for complete search history.

APPARATUS FOR CONTINUOUSLY MEASURING THICKNESS OF THIN MATERIAL, METHOD FOR CONTINUOUSLY MEASURING THICKNESS OF THIN MATERIAL USING SAME, AND METHOD FOR MANUFACTURING HIGH-TEMPERATURE SUPERCONDUCTING WIRE USING SAME

TECHNICAL FIELD

The present disclosure relates to a technology for measuring a thickness deviation of a thin material such as a thin film or a thin plate, and more particularly, to an apparatus for continuously measuring the thickness of a thin material, which is applied to a manufacturing process of a thin material to provide real-time thickness deviation detection information and allows thickness deviation compensation to be performed during the manufacture of the thin material by reflecting the real-time thickness deviation detection information, and a method for manufacturing a high-temperature superconducting wire using the same.

BACKGROUND ART

In general, a method for measuring the thickness of a thin material having at least a predetermined length such as a thin plate or a thin film is performed locally and intermittently.

Therefore, problems arise in that it is difficult to measure distributions in a lengthwise direction and at the same time a widthwise direction, the precision is low and it is difficult to measure an overall shape.

When exact thickness distributions in the lengthwise direction and the widthwise direction are not known, an error range increases when designing a product using a thin material.

Therefore, in order to improve the performance of a product, technologies for measuring and compensating thicknesses when depositing various thin films have been researched and developed.

For example, Korean Patent No. 10-2245087 entitled "Thickness Measuring Apparatus for a Deposition Equipment" discloses a technology for measuring the thickness of a deposited film in real time during a deposition process.

In the above registered patent, the thickness of a substrate for measurement is calculated through a change in polarization of light incident on and reflected from the substrate measured by optical sensors. As thickness measurement is performed using incident and reflecting light of one wavelength to and from the substrate for measurement inside a vacuum chamber, advantages are provided in that cost reduction is possible and thickness measurement may be quickly performed.

However, in the conventional technologies for measuring the thickness of a thin film, including the registered patent, the thickness of a single substrate is intermittently measured, is measured by configuring quartz crystal microbalance (QCM) sensors into a plurality of arrays, or is measured by measuring polarization using a light source unit and a reflector unit on the surface of the substrate.

A high-temperature superconducting wire is manufactured in a reel-to-reel scheme for lengthening, and a buffer layer, a superconducting layer, a protective layer and a stabilization layer are formed on a substrate through continuous processes.

Therefore, as the thickness distributions of the functional layers sequentially stacked on the substrate form the thickness distribution of the finally manufactured high-temperature superconducting wire, continuous thickness measurement considering this is required.

However, since different materials are deposited as the functional layers, a plurality of sensors are required to perform measurement in the conventional polarization scheme, and difficulties exist in measuring thickness distributions in a widthwise direction and a lengthwise direction and an overall thickness distribution of the high-temperature superconducting wire.

DISCLOSURE

Technical Problem

An objective of the present disclosure is to provide an apparatus for continuously measuring the thickness of a thin material, capable of continuously measuring, in various methods, a thin material continuously supplied.

Another objective of the present disclosure is to provide an apparatus for continuously measuring the thickness of a thin material, in which a thickness distribution of a thin material having a plurality of stacked layers is measured in each process and thickness compensation is performed by reflecting a measurement result in a manufacturing process in real time.

Still another objective of the present disclosure is to provide a method for manufacturing a high-temperature superconducting wire using the above-described apparatus for continuously measuring the thickness of a thin material.

Technical Solution

In an embodiment, an apparatus for continuously measuring the thickness of a thin material may include: a main frame configured by an upper frame and a lower frame which are provided in a direction crossing with a movement direction of a thin material to be measured and a vertical frame which connects the upper frame and the lower frame; an upper slider and a lower slider moved by sliding along guide grooves which are formed in the upper frame and the lower frame; an upper confocal sensor provided on the upper slider, and radiating light toward the thin material; and a lower confocal sensor provided on the lower slider, and radiating light toward the thin material, wherein the upper confocal sensor and the lower confocal sensor are disposed on the same axis according to a coaxial driving scheme, and height measurement is performed by receiving light only at a moment when a focus coincides at a measurement position, and wherein the upper confocal sensor and the upper slider and the lower confocal sensor and the lower slider are synchronously controlled, and are controlled in conjunction with movement of the thin material.

The upper confocal sensor and the lower confocal sensor perform thickness distribution measurement in any one method among an intermittent widthwise direction scan line in which a thickness distribution is measured through synchronous control of the upper slider and the lower slider, a lengthwise direction scan line in which a thickness distribution is measured in conjunction with movement of the thin material in a state in which the upper slider and the lower slider are fixed at a specific position, and a meandering scan line in which a thickness distribution is measured in conjunction with movement of the upper slider, the lower slider and the thin material.

In an embodiment, a method for continuously measuring the thickness of a thin material may include: measurement preparation step in which a thin material provided to be movable for a continuous manufacturing process of a thin material as a measurement target and at least one of the apparatus for continuously measuring the thickness of a thin material according to claim 1 or 2 in correspondence to an entire manufacturing process are disposed; representative shape measurement step in which a representative shape of the thin material is measured using any one measurement apparatus in a state in which movement of the thin material prepared through the measurement preparation step is stopped and a measured representative shape is transmitted to a main control unit; thickness measurement information setting step in which the main control unit receives information on the measured representative shape and movement control information is determined according to a measurement width and a measurement length of the thin material; and measurement method selection step in which a thickness distribution measurement method is selected on the basis of the movement control information set through the thickness measurement information setting step, wherein, in the measurement method selection step, any one among a method of forming a scan line for detecting a thickness distribution of the thin material in a widthwise direction, a method of forming a scan line for detecting a thickness distribution of the thin material in a lengthwise direction and a method of forming a meandering scan line for detecting an overall thickness distribution of the thin material is selected.

In the measurement method selection step, the scan line for detecting a thickness distribution of the thin material in a widthwise direction measures a thickness distribution by driving the measurement apparatus in a state in which movement of the thin material is stopped, the lengthwise direction scan line measures a thickness distribution by moving the thin material in a state in which the measurement apparatus is moved to a specific position, and the meandering scan line measures a thickness distribution by driving the measurement apparatus while moving the thin material.

In an embodiment, a method for manufacturing a high-temperature superconducting wire may include: measurement preparation step in which a substrate to be moved in a reel-to-reel scheme using movement means including a supply reel and a recovery real, a plurality of deposition chambers for sequentially depositing deposition materials on the substrate and apparatuses for continuously measuring the thickness of a thin material according to claim 1 or 2 whose number corresponds to the number of the deposition chambers are disposed; representative shape measurement step in which a representative shape of the substrate is measured using a first measurement apparatus in a state in which movement of the prepared substrate is stopped and a measured representative shape is transmitted to a main control unit; thickness measurement information setting step in which the main control unit receives information on the measured representative shape and movement control information is determined according to a measurement width and a measurement length of the substrate; measurement method selection step in which a thickness distribution measurement method is selected on the basis of the movement control information set through the thickness measurement information setting step; and compensating deposition step for each section in which a thickness deviation is detected while the substrate is moved according to a measurement method selected in the measurement method selection step and compensating deposition for the detected thickness deviation is performed, wherein the measurement method selection step and the compensating deposition step for each section are sequentially repeated in correspondence to the number of the deposition materials to be sequentially deposited on the substrate until deposition is completed.

A buffer layer, a superconducting layer, a protective layer and a stabilization layer are deposited on the substrate. In the compensating deposition step for each section, thickness-compensating deposition of the buffer layer is performed in a first chamber in correspondence to a thickness deviation of a representative shape measured by a first measurement apparatus, thickness-compensating deposition of the superconducting layer is performed on the substrate on which the buffer layer is deposited, in a second chamber in correspondence to a thickness deviation of the buffer layer measured according to a method selected through the measurement method selection step, thickness-compensating deposition of the protective layer is performed on the substrate on which the superconducting layer is deposited, in a third chamber in correspondence to a thickness deviation of the superconducting layer measured according to a method selected through the measurement method selection step, and thickness-compensating deposition of the stabilization layer is performed on the substrate on which the protective layer is deposited, in a fourth chamber in correspondence to a thickness deviation of the protective layer measured according to a method selected through the measurement method selection step.

In the compensating deposition step for each section, a fifth measurement apparatus for measuring a thickness distribution after the stabilization layer is deposited is further provided, and measures a final thickness distribution of the substrate including the stabilization layer.

Advantageous Effects

According to the embodiments of the present disclosure, thickness measurement of a thin material having at least a predetermined length in a lengthwise direction and a widthwise direction may be continuously performed.

In particular, the present disclosure is configured in a coaxial scheme in which an upper confocal sensor and a lower confocal sensor are disposed on the same axis so that height measurement may be performed by receiving light only at a moment when a focus coincides at a measurement position. Since the upper confocal sensor and the lower confocal sensor are configured by using sliders to be movable by at least a widthwise length of a thin material as a measurement target, thickness measurement, real-time monitoring and data storage may be performed in various ways.

As a measurement apparatus configured as described above is disposed between deposition processes during the manufacture of a high-temperature superconducting wire, not only an overall thickness distribution but also a thickness deviation at a desired position may be measured even when different materials are sequentially deposited. By reflecting this, a manufacturing process for compensating for a thickness deviation measured during a subsequent process may be performed, whereby it is possible to achieve uniform thickness distributions in a lengthwise direction and a widthwise direction of a finally manufactured high-temperature superconducting wire.

Therefore, as an inter-turn contact failure of a superconducting appliance using a high-temperature superconducting wire is improved, deformation and breakage of the wire due to high electromagnetic force generated in a thickness-wise direction when a high magnetic field is applied may be prevented.

MODE FOR INVENTION

Hereinafter, aspects of the present disclosure will be described in detail with reference to the accompanying drawings. In the following description, the same components will be designated by the same reference numerals although they are shown in different drawings. In addition, in the following description of embodiments of the present disclosure, when it is determined that the detailed description of a related known configuration or function impedes understanding of the embodiment of the present disclosure, the description will be simplified or omitted. When it is described that a component is "included" or "disposed" on one side of another component, it is to be understood that the component may be directly included, stacked or fixed on one side of the other component but still another component may be "included" or "disposed" between the respective components.

An apparatus for continuously measuring the thickness of a thin material according to the present disclosure is to measure in various methods a thickness distribution of a thin material having at least a predetermined length. By measuring in various methods the thin material as a measurement target while continuously moving the thin material in one direction, not only an overall thickness distribution but also a thickness distribution at a specific position may be measured.

Figure 1:
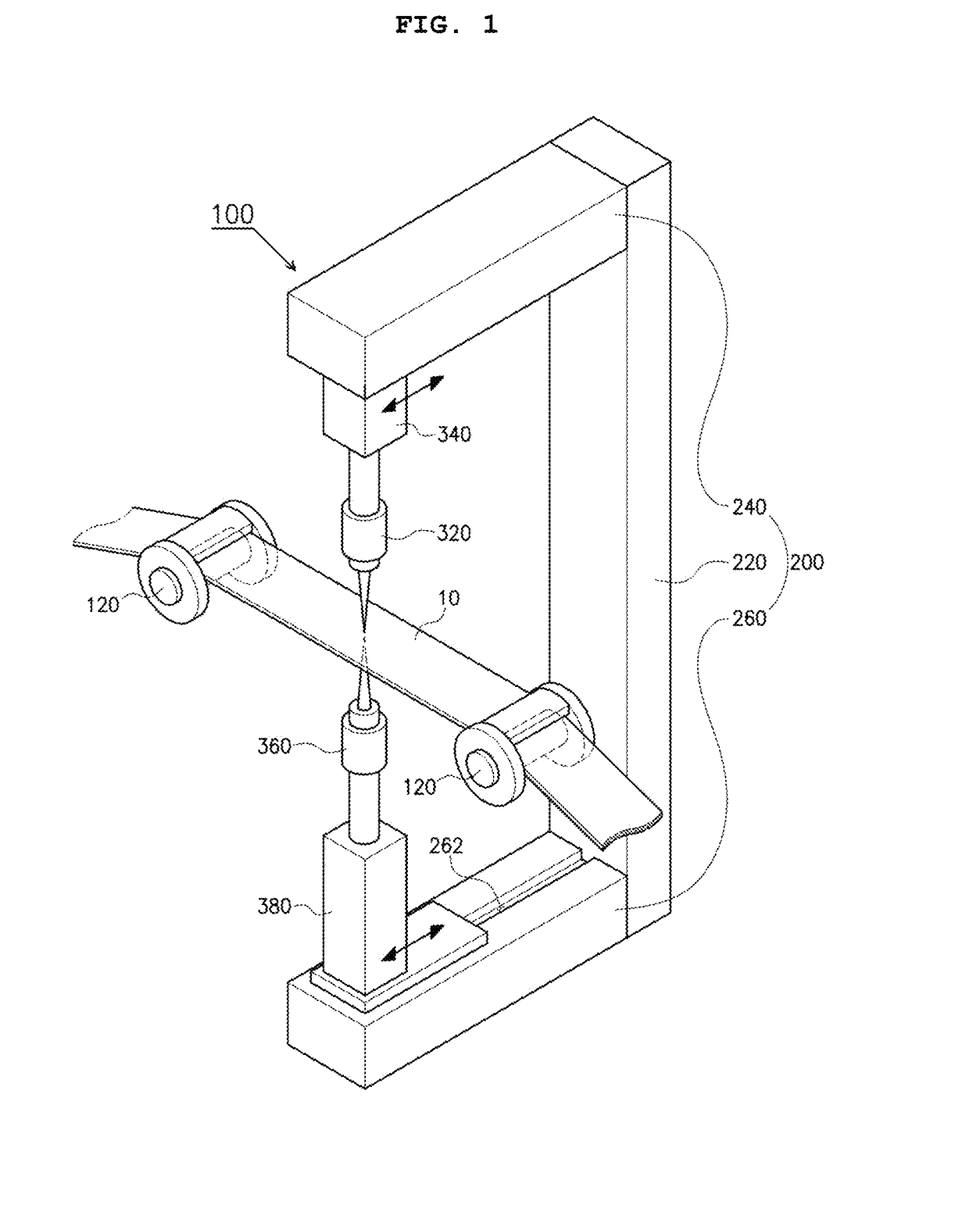
FIG. 1 is a view illustrating an apparatus for continuously measuring the thickness of a thin material in accordance with an embodiment of the present disclosure.
Figure 2:
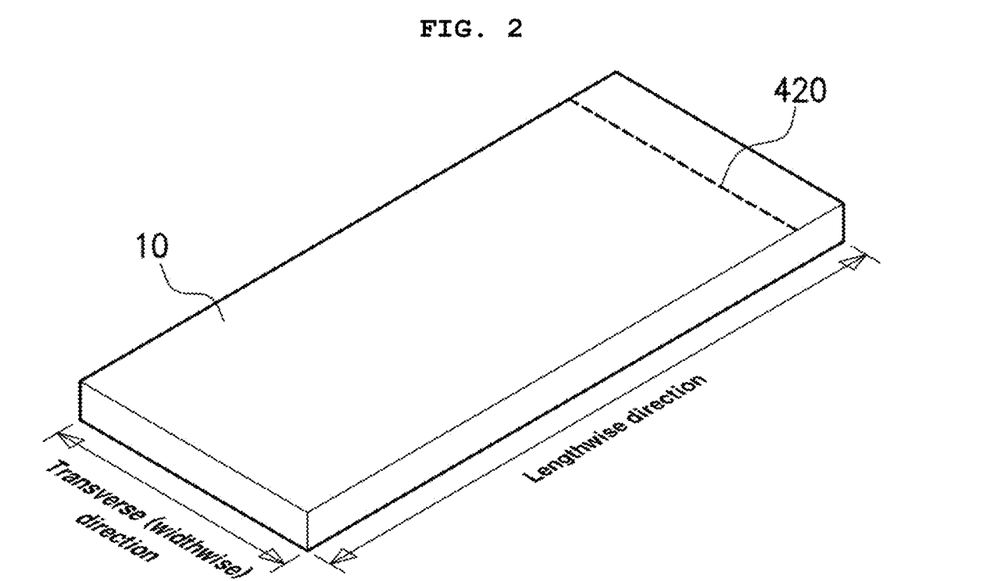
FIGS. 2 to 4 are views explaining various methods for measuring thin films using the measurement apparatus shown in FIG. 1.
Figure 3:
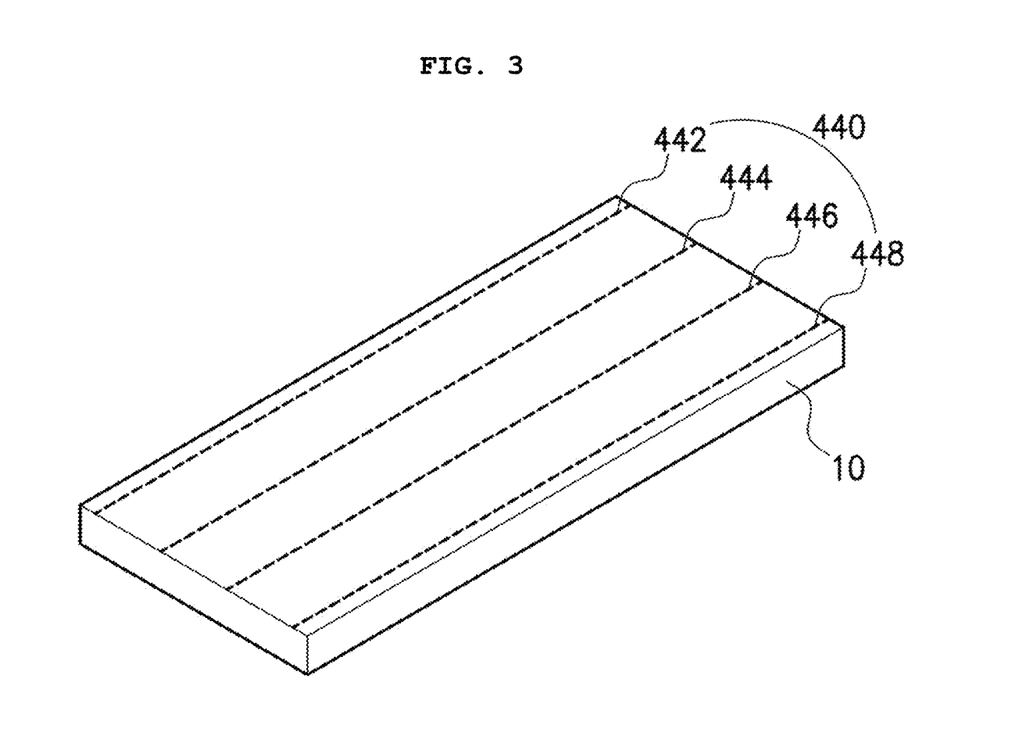
Figure 4:
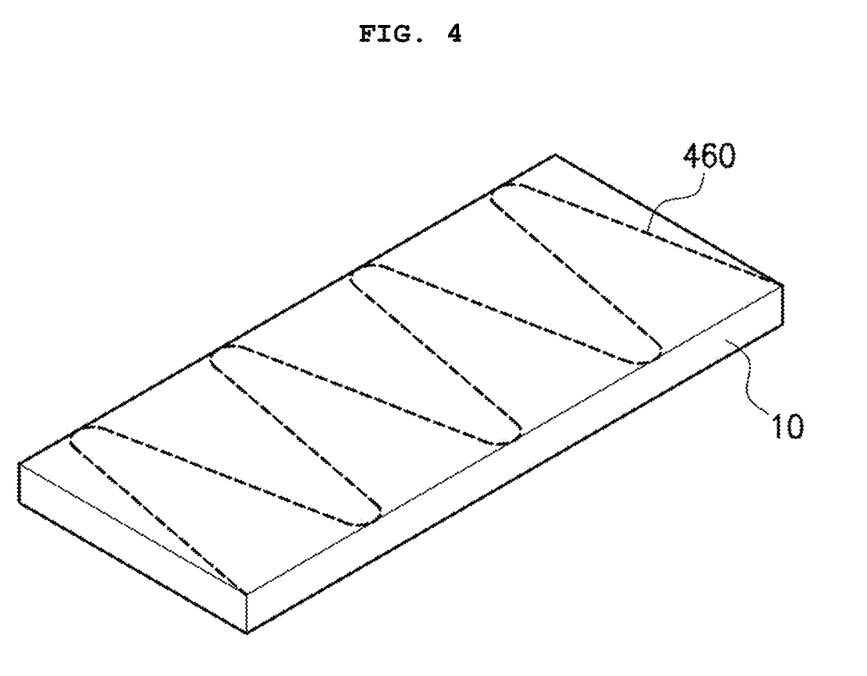

In detail, FIG. 1 is a view illustrating an apparatus for continuously measuring the thickness of a thin material in accordance with an embodiment of the present disclosure, and FIGS. 2 to 4 are views explaining various methods for measuring thin films using the measurement apparatus shown in FIG. 1.

Referring to these drawings, the apparatus for continuously measuring the thickness of a thin material (hereinafter referred to as a "measurement apparatus 100") in accordance with the embodiment of the present disclosure includes a main frame 200 which is disposed in a direction crossing with a movement direction of a thin material 10 to be measured, and confocal sensors for radiating laser light from above and below the thin material 10 are provided in the main frame 200.

In detail, the main frame 200 is composed of a vertical frame 220, an upper frame 240 and a lower frame 260. The upper frame 240 and the lower frame 260 are disposed to be spaced apart from each other by a predetermined distance on the same axis in a direction crossing with the movement direction of the thin material 10.

The upper frame 240 and the lower frame 260 are provided with an upper slider 340 and a lower slider 380, respectively, and the respective sliders 340 and 380 are moved by sliding along guide grooves 262.

Therefore, as an upper confocal sensor 320 which is mounted to the upper slider 340 and a lower confocal sensor 360 which is mounted to the lower slider 380 are moved in the direction crossing with the movement direction of the thin material 10, that is, a widthwise direction of the thin material 10, measurement may be performed. The movement distance of the respective sliders 340 and 380 has a length larger than the width of the thin material 10.

The upper confocal sensor 320 and the lower confocal sensor 360 are driven according to a coaxial driving scheme. As the upper confocal sensor 320 and the lower confocal sensor 360 are disposed on the same axis, height measurement is performed by receiving light only at a moment when a focus coincides at a measurement position.

To this end, the upper slider 340 and the lower slider 380 may be synchronously controlled, and thickness measurement, real-time monitoring and data storage may be performed in various ways in conjunction with movement means for moving the thin material 10.

In detail, FIG. 2 is a diagram for explaining measurement of a thickness distribution in a transverse (widthwise) direction of the thin material 10 by using the measurement apparatus 100 in accordance with the present disclosure. In a state in which driving of the movement means is stopped, a representative shape in the widthwise direction may be measured by moving the upper confocal sensor 320 and the lower confocal sensor 360.

Figure 5:
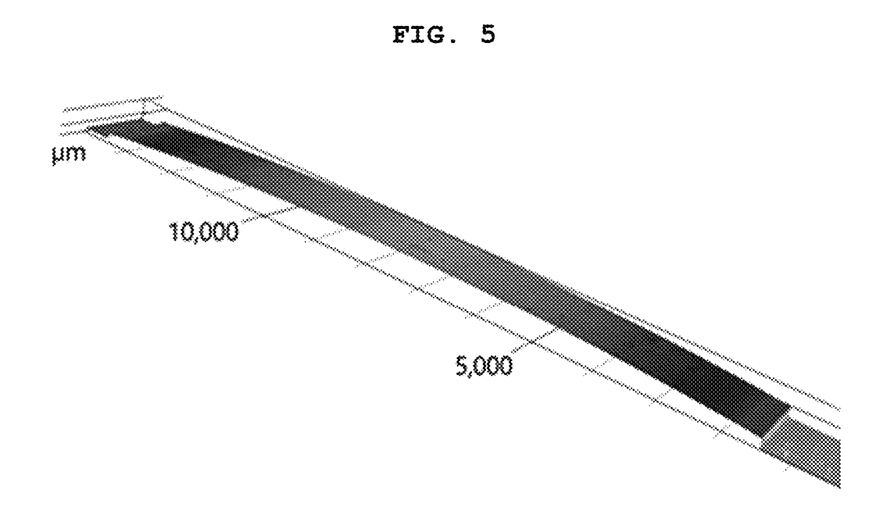
FIGS. 5 and 6 are views illustrating an example in which scan information measured by the method of FIG. 2 is shown.
Figure 6:
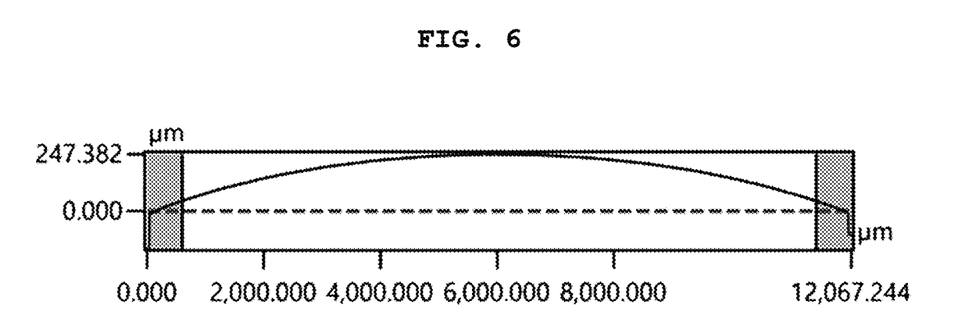
Figure 7:
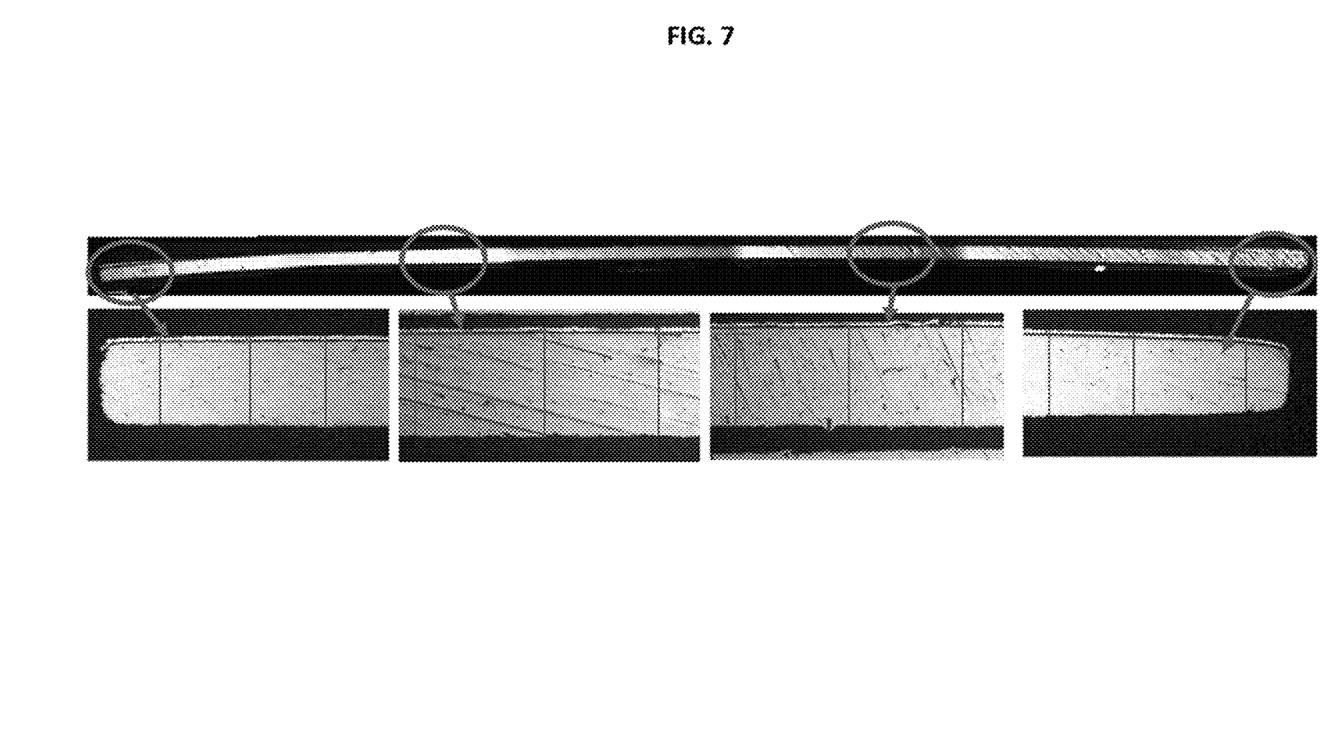
FIG. 7 is a view showing an actual transverse cross-sectional microphotograph of a thin material whose thickness is measured in FIGS. 5 and 6.

FIGS. 5 and 6 are views illustrating an example in which scan information measured by the method of FIG. 2 is shown, and FIG. 7 is a diagram showing an actual transverse cross-sectional microphotograph of a thin material whose thickness is measured in FIGS. 5 and 6.

Referring to these drawings, as shown in FIG. 5, the current curvature of the thin material 10 may be checked through measurement in the widthwise direction of the thin material 10 as a measurement target. As shown in FIG. 6, by excluding both end portions measured beyond the width of the thin material 10, the measurement range of the upper confocal sensor 320 and the lower confocal sensor 360 according to the representative shape may be determined.

The measurement range is determined through the measurement of the representative shape as described above, and on the basis of the measurement range, measurement may be performed in various measurement methods while forming an intermittent widthwise direction scan line 420, a lengthwise direction scan line 440 and a meandering scan line 460 by moving the thin material 10 through driving of the movement means and the sliders 340 and 380.

That is to say, in the intermittent widthwise direction scan line 420, the driving of the movement means is stopped at each predetermined section on the basis of the length in the widthwise direction of the thin material 10 checked through the measurement of the representative shape, and a thickness distribution in the widthwise direction is measured by moving the upper confocal sensor 320 and the lower confocal sensor 360.

The lengthwise direction scan line 440 may be applied when it is necessary to check a widthwise thickness in the lengthwise direction along a specific position of the thin material 10, and thickness measurement is performed by moving the movement means in a state in which the upper confocal sensor 320 and the lower confocal sensor 360 are fixed in their positions.

For the sake of convenience in explanation, when dividing the lengthwise direction scan line 440 shown in FIG. 3 into first to fourth scan lines 442, 444, 446 and 448, in the case where it is necessary to measure edge portions of the thin material 10, thickness measurement is performed by moving the movement means after fixing the upper confocal sensor 320 and the lower confocal sensor 360 in their positions by moving the upper confocal sensor 320 and the lower confocal sensor 360 to positions corresponding to the first scan line 442 or the fourth scan line 448.

In the case where it is necessary to check an inside thickness deviation along the lengthwise direction of the thin material 10, thickness measurement is performed by moving the movement means after fixing the upper confocal sensor 320 and the lower confocal sensor 360 in their positions by moving the upper confocal sensor 320 and the lower confocal sensor 360 to positions corresponding to the second scan line 444 or the third scan line 446.

In the case where faster measurement is required, the meandering scan line 460 shown in FIG. 4 may be applied, and thickness measurement is performed by driving the movement means at a predetermined speed while repeatedly moving the upper confocal sensor 320 and the lower confocal sensor 360 with a predetermined cycle on the basis of the widthwise length checked when measuring the representative shape.

Hereinafter, measurement of a thickness distribution of a high-temperature superconducting wire having a multi-layered structure among thin materials 10 which may be measured using the present disclosure and a method for manufacturing a high-temperature superconducting wire using the same will be described.

Figure 8:
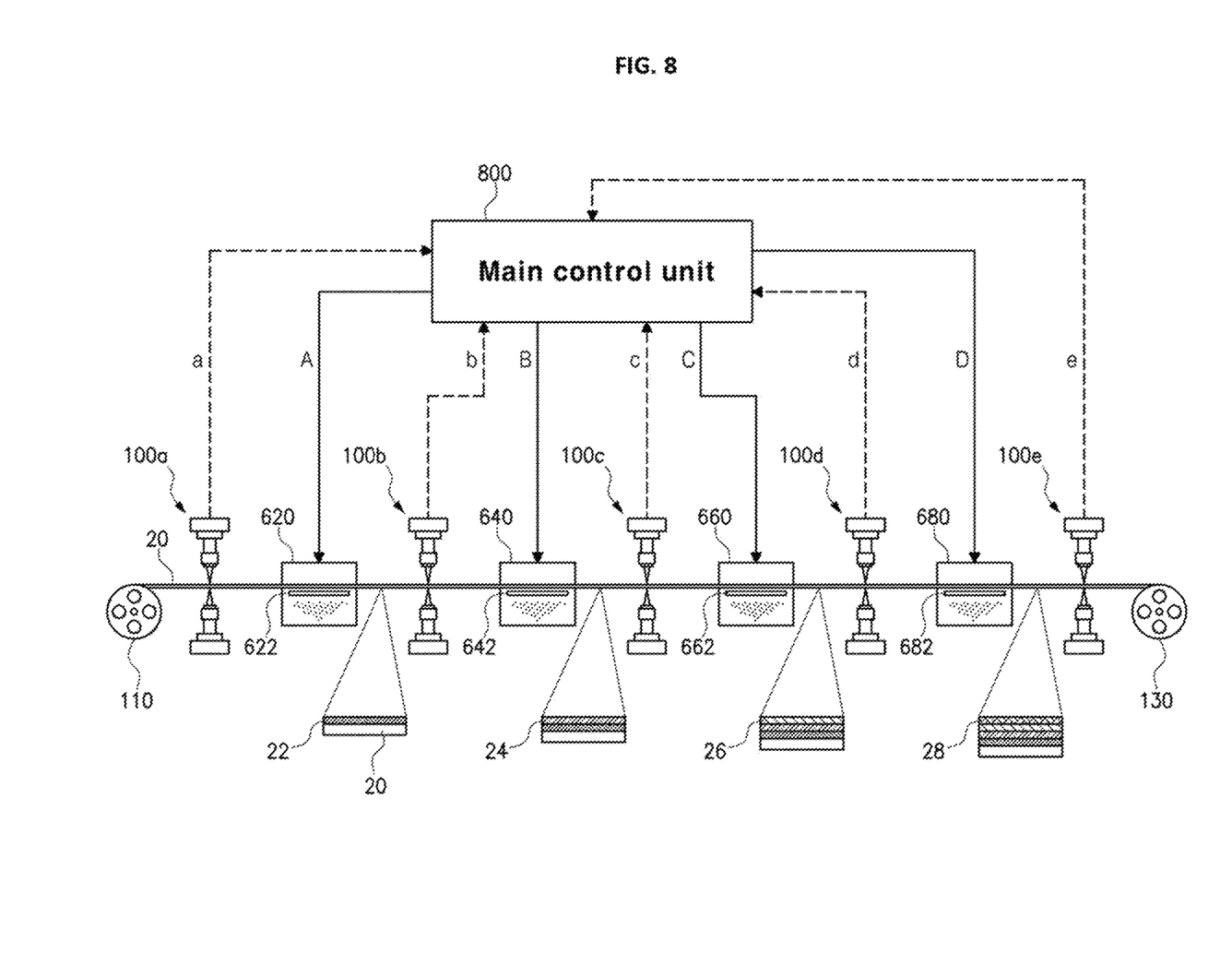
FIG. 8 is a view illustrating an embodiment of a high-temperature superconducting wire manufacturing line to which the apparatus for continuously measuring the thickness of a thin material in accordance with the present disclosure is applied.
Figure 9:
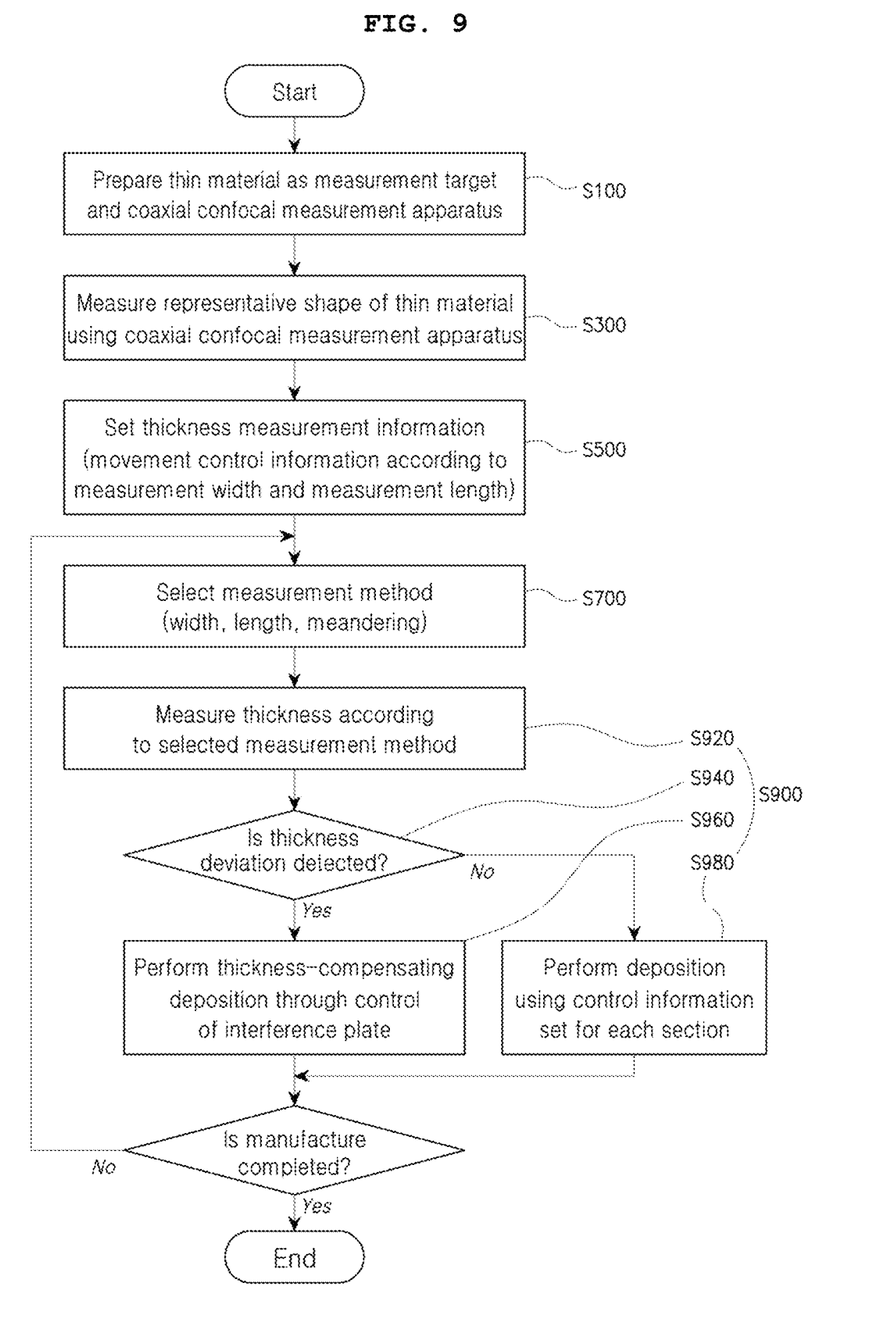
FIG. 9 is a flowchart showing an embodiment of a method for manufacturing a high-temperature superconducting wire according to FIG. 8.

FIG. 8 is a view illustrating an embodiment of a high-temperature superconducting wire manufacturing line to which the apparatus for continuously measuring the thickness of a thin material in accordance with the present disclosure is applied, and FIG. 9 is a flowchart showing an embodiment of a method for manufacturing a high-temperature superconducting wire according to FIG. 8.

Referring to these drawings, the measurement apparatus 100 according to the present disclosure is disposed between respective unit processes for manufacturing a high-temperature superconducting wire having a multi-layered structure to provide real-time thickness distribution measurement information, and by reflecting the real-time thickness distribution measurement information, allows the high-temperature superconducting wire to be manufactured.

In the present embodiment, a manufacturing line, in which a buffer layer 22, a superconducting layer 24, a protective layer 26 and a stabilization layer 28 are stacked on a substrate 20 while the substrate 20 is continuously supplied by a supply reel 110 and a recovery reel 130, is constructed.

First to fifth measurement apparatuses 100a, 100b, 100c, 100d and 100e are provided on the manufacturing line constructed as described above in order to measure the representative shape of the substrate 20 and measure thickness distributions after respective processes. Thickness distribution information received from each measurement apparatus is monitored and stored, and is transferred to a deposition chamber for each unit process so that thickness-compensating deposition may be performed.

In detail, in the method for manufacturing a high-temperature superconducting wire according to the present embodiment, first, measurement preparation step (S100), in which the substrate 20 as a measurement target and coaxial confocal measurement equipment are disposed between respective unit processes, is performed.

In other words, in the measurement preparation step (S100), each of a plurality of measurement apparatuses, each of which is configured such that the substrate 20 may be continuously supplied using the supply reel 110 and the recovery reel 130 and the upper confocal sensor 320 and the lower confocal sensor 360 are coaxially disposed above and below, respectively, the substrate 20 to cross with the movement direction of the substrate 20, is disposed between respective unit processes.

When the substrate 20 is prepared to be moved by the supply reel 110 and the recovery reel 130 through the measurement preparation step (S100), representative shape measurement step (S300), in which the intermittent widthwise direction scan line 420 is applied by the first measurement apparatus 100a with the movement of the substrate 20 stopped to measure the representative shape of the substrate 20 and transmit measured information to a main control unit 800, is performed.

In the main control unit 800 which has received the measured representative shape information, thickness measurement information setting step (S500) for application of a measurement method is performed to determine movement control information according to a measurement width and a measurement length of the substrate 20.

Namely, the movement control information may be determined to include the movement displacement of the upper confocal sensor 320 and the lower confocal sensor 360 according to the measured representative shape and the movement length of the substrate 20 movable by the rotation of the supply reel 110 and the recovery reel 130.

When the movement control information is determined as described above, a manufacturing process for forming each of a plurality of deposited layers while moving the substrate 20 is performed in correspondence to thickness measurement information, and measurement method selection step (S700) therefor is performed.

In the measurement method selection step (S700), as described above, any one of the intermittent widthwise direction scan line 420, the lengthwise direction scan line 440 and the meandering scan line 460 may be selected, and a selected scan line may be individually set for each of the plurality of measurement apparatuses.

When a thickness distribution measurement method is determined through the measurement method selection step (S700) as described above, a thickness deviation is detected while the substrate 20 is moved, and compensating deposition step S900 for each section, in which compensating deposition for the detected thickness deviation is carried out, is performed.

Describing in more detail an embodiment of the compensating deposition step S900 for each section, in the measurement apparatus 100 according to the present disclosure, the first measurement apparatus 100a is disposed at an upstream side of a first deposition chamber 620 on the basis of the movement direction of the substrate 20, and thickness measurement step S920, in which the thickness deviation of the substrate 20 is measured as described above, is performed.

The thickness measurement step S920 may be differently set according to a measurement apparatus provided at each section. In the first measurement apparatus 100a, the intermittent widthwise direction scan line 420 is applied, and widthwise direction thickness measurement is performed in a state in which the movement means including the supply reel 110 and the recovery reel 130 is stopped.

When thickness measurement is completed according to the measurement method selected as described above, thickness deviation detection step S940, in which measurement information is transferred to the main control unit 800 and a thickness deviation is detected, is performed.

When a thickness deviation is detected through the thickness deviation detection step S940, deviation-responding deposition step S960, in which thickness-compensating deposition is carried out is performed, and when a thickness deviation is not detected, deposition is performed using control information set for each section (S980).

In the deviation-responding deposition step S960, sputtering deposition using an interference plate may be performed to compensate for the thickness deviation.

Figure 10:
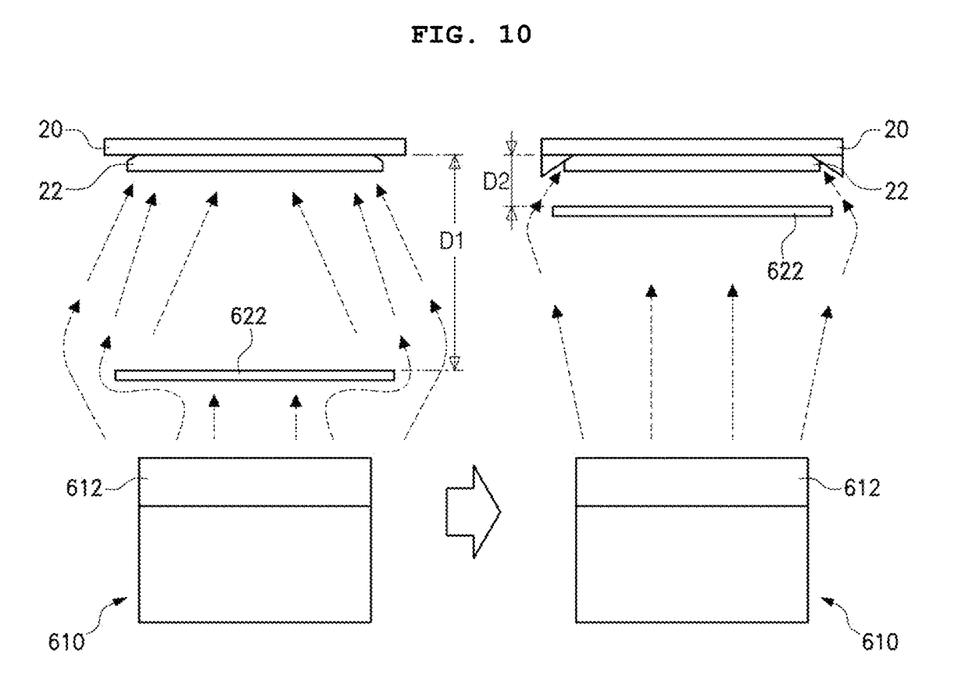
FIG. 10 is a view illustrating an embodiment of thickness deviation compensation deposition performed by reflecting information measured through the apparatus for continuously measuring the thickness of a thin material in accordance with the present disclosure.

FIG. 10 is a view illustrating an embodiment of thickness deviation compensation deposition performed by reflecting information measured through the apparatus for continuously measuring the thickness of a thin material in accordance with the present disclosure. For the sake of convenience in explanation, description will be focused on deviation-compensating deposition performed in the first deposition chamber 620, and the same scheme may be applied to deviation-compensating deposition for each chamber.

In the deviation-responding deposition step S960, deposition is performed while moving the position of the interference plate in correspondence to a portion requiring gradient deposition.

That is to say, referring to FIG. 10, when the stacking of the buffer layer 22 on the substrate 20 is started, a first interference plate 622 is moved to a position adjacent to deposition means 610.

In the state in which the first interference plate 622 is moved as described above, when a target material 612 is evaporated by the deposition means 610, since a sufficient distance D1 is secured after scattering metal particles moving toward the substrate 20 detour the first interference plate 622, the scattering metal particles may be deposited on an entire area including the central portion of the substrate 20.

When a deposition gradient occurs at edge portions of the substrate 20, the first interference plate 622 is disposed adjacent to the substrate 20. When the target material 612 is evaporated using the deposition means 610, as a movement distance D2 of scattering metal particles having detoured the first interference plate 622 is limited, the scattering metal particles are guided to the edge portions of the substrate 20 so that edge gradient deposition is performed.

In other words, in the deviation-responding deposition step S960, the position of an interference plate is determined according to a thickness deviation detected in the thickness deviation detection step S940, and thereby, deviation-responding deposition is performed.

When the deposition of the buffer layer 22 is completed in the first deposition chamber 620 through the above-described process, a thickness deviation in a state in which the buffer layer 22 is deposited on the substrate 20 is measured according to a measurement method set in the second measurement apparatus 100b, and when a thickness deviation occurs, thickness deviation-compensating deposition is performed.

Namely, the thickness measurement step S920 is also performed in the second measurement apparatus 100b, and a measurement result is transferred to the main control unit 800 to perform the thickness deviation detection step S940.

When a thickness deviation is detected in the thickness deviation detection step S940, deviation information is transferred to a second deposition chamber 640, and the deviation-responding deposition step S960 using a second interference plate 642 is performed so that the thickness distribution of the substrate 20 on which the buffer layer 22 and the superconducting layer 24 are stacked becomes more uniform.

In addition, even in the case of the protective layer 26 which is additionally deposited on the superconducting layer 24, when a thickness deviation is detected while the substrate 20 passes through the third measurement apparatus 100c and a third deposition chamber 660, the deviation-responding deposition step S960 is performed using a third interference plate 662 in correspondence to the detected deviation. Even in the case of the stabilization layer 28 which is deposited on the protective layer 26, in correspondence to a deviation detected while the substrate 20 passes through the fourth measurement apparatus 100d and a fourth deposition chamber 680, the deviation-responding deposition step S960 using a fourth interference plate 682 is performed.

After the stabilization layer 28 is deposited, in order to measure the final thickness of the manufactured high-temperature superconducting wire, final thickness distribution measurement may be performed using the fifth measurement apparatus 100e.

In the thickness distribution measurement for each unit process performed as described above, guide reels 120 (see FIG. 1) may be further provided for horizontal movement through a measurement section.

While an apparatus for continuously measuring the thickness of a thin material and a method for manufacturing a high-temperature superconducting wire using the same according to the present disclosure have been particularly shown and described with reference to exemplary embodiments thereof, the present disclosure is not limited to the embodiments, and it will be understood by those of ordinary skill in the art that various changes in form and details may be made therein without departing from the spirit and scope of the present disclosure as defined by the following claims. It is therefore desired that the embodiments be considered in all respects as illustrative and not restrictive, reference being made to the appended claims rather than the foregoing description to indicate the scope of the present disclosure.

The invention claimed is:

1. A method for continuously measuring a thickness of a thin material, the method comprising:
   measurement preparation step in which the thin material provided to be movable for a continuous manufacturing process of the thin material as a measurement target and at least one of the apparatus for continuously measuring the thickness of the thin material in correspondence to an entire manufacturing process are disposed;
   representative shape measurement step in which a representative shape of the thin material is measured using any one measurement apparatus in a state in which movement of the thin material prepared through the measurement preparation step is stopped and a measured representative shape is transmitted to a main control unit;

thickness measurement information setting step in which the main control unit receives information on the measured representative shape and movement control information is determined according to a measurement width and a measurement length of the thin material; and measurement method selection step in which a thickness distribution measurement method is selected on the basis of the movement control information set through the thickness measurement information setting step, wherein, in the measurement method selection step, any one among a method of forming a scan line for detecting a thickness distribution of the thin material in a widthwise direction, a method of forming a scan line for detecting a thickness distribution of the thin material in a lengthwise direction and a method of forming a meandering scan line for detecting an overall thickness distribution of the thin material is selected, wherein the apparatus comprises:

a main frame configured by an upper frame and a lower frame which are provided in a direction crossing with a movement direction of the thin material to be measured and a vertical frame which connects the upper frame and the lower frame;

an upper slider and a lower slider moved by sliding along guide grooves which are formed in the upper frame and the lower frame;

an upper confocal sensor provided on the upper slider, and radiating light toward the thin material; and a lower confocal sensor provided on the lower slider, and radiating light toward the thin material, wherein the upper confocal sensor and the lower confocal sensor are disposed on the same axis according to a coaxial driving scheme, and height measurement is performed by receiving light only at a moment when a focus coincides at a measurement position, and wherein the upper confocal sensor and the upper slider and the lower confocal sensor and the lower slider are synchronously controlled, and are controlled in conjunction with movement of the thin material.

2. The method of claim 1, wherein, in the measurement method selection step, the scan line for detecting a thickness distribution of the thin material in a widthwise direction measures a thickness distribution by driving the measurement apparatus in a state in which movement of the thin material is stopped, the lengthwise direction scan line measures a thickness distribution by moving the thin material in a state in which the measurement apparatus is moved to a specific position, and the meandering scan line measures a thickness distribution by driving the measurement apparatus while moving the thin material.

* * * * *